United States Patent
Kim et al.

(10) Patent No.: US 10,623,157 B2
(45) Date of Patent: Apr. 14, 2020

(54) METHOD FOR TRANSMITTING AND RECEIVING DM-RS IN WIRELESS COMMUNICATION SYSTEM AND APPARATUS THEREFOR

(71) Applicant: LG ELECTRONICS INC., Seoul (KR)

(72) Inventors: Hyungtae Kim, Seoul (KR); Kyuseok Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 12 days.

(21) Appl. No.: 16/064,882

(22) PCT Filed: Apr. 27, 2018

(86) PCT No.: PCT/KR2018/004927
§ 371 (c)(1),
(2) Date: Jun. 21, 2018

(87) PCT Pub. No.: WO2018/203621
PCT Pub. Date: Nov. 8, 2018

(65) Prior Publication Data
US 2020/0028643 A1 Jan. 23, 2020

Related U.S. Application Data

(60) Provisional application No. 62/492,213, filed on Apr. 30, 2017, provisional application No. 62/501,771, (Continued)

(51) Int. Cl.
*H04L 5/00* (2006.01)
*H04W 72/04* (2009.01)

(52) U.S. Cl.
CPC ......... *H04L 5/0048* (2013.01); *H04W 72/042* (2013.01); *H04W 72/044* (2013.01)

(58) Field of Classification Search
CPC .. H04L 5/0048; H04W 72/042; H04W 72/044
See application file for complete search history.

(56) References Cited

U.S. PATENT DOCUMENTS

| 2013/0294368 A1 | 11/2013 | Bendlin et al. |
| 2019/0068308 A1* | 2/2019 | Shin ........................ H04J 13/12 |

FOREIGN PATENT DOCUMENTS

| WO | WO 2014/142578 A1 | 9/2014 |

OTHER PUBLICATIONS

Huawei et al., 'Design of DL DMRS for data transmission', 3GPP TSG-RAN WG1 Meeting #88bis R1-1704233, Apr. 3-7, 2017, Spokane, USA, 6 pages.
(Continued)

*Primary Examiner* — Rhonda L Murphy
(74) *Attorney, Agent, or Firm* — Dentons US LLP

(57) ABSTRACT

A method for receiving a downlink signal by a user equipment (UE) from an eNB in a wireless communication system is disclosed. In detail, the method comprises the steps of receiving a downlink control channel from the eNB; and receiving, from the eNB, a downlink data channel and a front loaded reference signal for demodulation of the downlink data channel by using control information included in the downlink control channel, wherein resource elements of symbols to which a front loaded reference signal is received are identified by two multiplexing groups or three multiplexing groups, and the downlink control channel includes information on a multiplexing group, to which the front loaded reference signal is allocated, among the multiplexing groups, and information on the number of multiplexing groups, to which data are not allocated, among the multiplexing groups.

8 Claims, 9 Drawing Sheets

--- receive downlink control channel that includes information on multiplexing group to which FL DM-RS is allocated and information on the number of multiplexing groups to which data are not allocated — S901 receive FL DM-RS and downlink data channel on the basis of downlink control channel — S903

Related U.S. Application Data filed on May 5, 2017, provisional application No. 62/519,796, filed on Jun. 14, 2017, provisional application No. 62/542,783, filed on Aug. 8, 2017, provisional application No. 62/557,084, filed on Sep. 11, 2017, provisional application No. 62/571,274, filed on Oct. 12, 2017, provisional application No. 62/571,267, filed on Oct. 12, 2017, provisional application No. 62/594,518, filed on Dec. 4, 2017.

(56) References Cited

OTHER PUBLICATIONS

NTT DOCOMO, 'Discussion on DM-RS and evaluation results', 3GPP TSG-RAN WG1 Meeting #88bis R1-1705725, Apr. 3-7, 2017, Spokane, USA, 10 pages.

Etri, "Discussion on Control Resource Set and DMRS for DL Control Channel," 3GPP TSG RAN WG1 NR Ad-Hoc Meeting, R1-1700581, Spokane, USA, Jan. 16-20, 2017, pp. 1-5.

Huawei et al., "Design of DL DMRS for Data Transmission," 3GPP TSG RAN WG1 Meeting #88bis, R1-1704233, Spokane, USA, Apr. 3-7, 2017, 6 pages.

Huawei et al., "Discussion on DL DMRS Design for Short TTI," 3GPP TSG RAN WG1 Meeting #88, R1-1701734, Athens, Greece, Feb. 13-17, 2017, 8 pages.

Huawei et al., "Transmission Schemes of DL Control Channel," 3GPP TSG RAN WG1 Meeting #88bis, R1-1704200, Spokane, USA, Apr. 3-7, 2017, 8 pages.

LG Electronics, "Discussion on Control Channel Design," 3GPP TSG RAN WG1 Meeting NR Ad-Hoc Meeting, R1-1700493, Spokane, USA, Jan. 16-20, 2017, pp. 1-7.

LG Electronics, "On DL DMRS Design," 3GPP TSG RAN WG1 Meeting #88bis, R1-1706168, Spokane, USA, Apr. 3-7, 2017, pp. 1-7.

NTT Docomo, Inc., "Discussion on DM-RS and Evaluation Results," 3GPP TSG RAN WG1 Meeting #88bis, R1-1705725, Spokane, USA, Apr. 3-7, 2017, pp. 1-10.

Qualcomm, "Summary of Issues on DMRS," 3GPP TSG RAN WG1 88bis, R1-1706637, Spokane, USA, Apr. 3-7, 2017, 3 pages.

Vivo, "On Front-Loaded and Additional DMRS Design," 3GPP TSG RAN WG1 Meeting #88, R1-1703391, Athens, Greece, Feb. 13-17, 2017, 4 pages.

* cited by examiner

FIG. 2
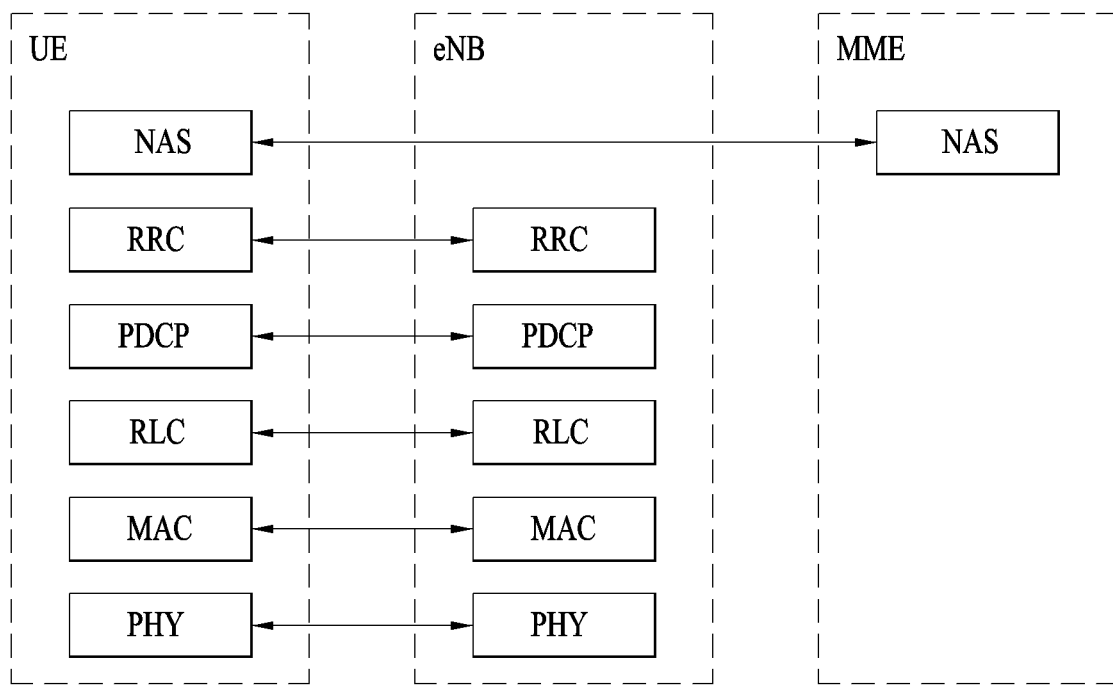
(A) CONTROL-PLANE PROTOCOL STACK
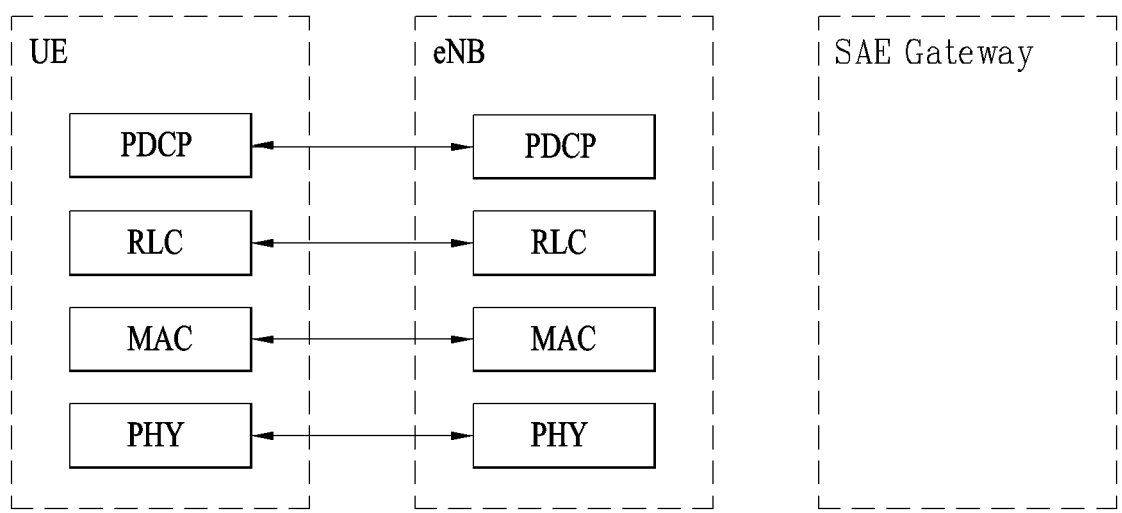
(B) USER-PLANE PROTOCOL STACK (A)                (B)

METHOD FOR TRANSMITTING AND RECEIVING DM-RS IN WIRELESS COMMUNICATION SYSTEM AND APPARATUS THEREFOR

CROSS REFERENCE TO RELATED APPLICATIONS

This application is the National Phase of PCT International Application No. PCT/KR2018/004927, filed on Apr. 27, 2018, which claims priority under 35 U.S.C. 119(e) to U.S. Provisional Application No. 62/492,213, filed on Apr. 30, 2017, 62/501,771, filed on May 5, 2017, 62/519,796, filed on Jun. 14, 2017, 62/542,783, filed on Aug. 8, 2017, 62/557,084, filed on Sep. 11, 2017, 62/57,1274, filed on Oct. 12, 2017, 62/57,1267, filed on Oct. 12, 2017, and 62/594,518, filed on Dec. 4, 2017 all of which are hereby expressly incorporated by reference into the present application.

TECHNICAL FIELD

The present invention relates to a wireless communication system, and more particularly, to a method for transmitting and receiving a demodulation reference signal (DM-RS) in a next generation communication system and an apparatus therefor.

BACKGROUND ART

As an example of a wireless communication system to which the present invention is applicable, a 3rd Generation Partnership Project (3GPP) Long Term Evolution (LTE) communication system will be schematically described.

FIG. 1 is a diagram showing a network structure of an Evolved Universal Mobile Telecommunications System (E-UMTS) as a mobile communication system. The E-UMTS is an evolved form of the UMTS and has been standardized in the 3GPP. Generally, the E-UMTS may be called a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS mainly includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist per eNB. The cell is set to use a bandwidth such as 1.25, 2.5, 5, 10, 15 or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and Hybrid Automatic Repeat and reQest (HARQ)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic can be used between eNBs. A Core Network (CN) may include the AG and a network node or the like for user registration of the UE. The AG manages mobility of a UE on a Tracking Area (TA) basis. One TA includes a plurality of cells.

Although wireless communication technology has been developed up to Long Term Evolution (LTE) based on Wideband Code Division Multiple Access (WCDMA), the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

DISCLOSURE

Technical Problem

Based on the aforementioned discussion, an object of the present invention is to provide a method for transmitting and receiving a demodulation reference signal (DM-RS) in a next generation communication system and an apparatus therefor.

Technical Solution

According to one aspect of the present invention, a method for receiving a downlink signal by a user equipment (UE) from an eNB in a wireless communication system comprises the steps of: receiving a downlink control channel from the eNB; and receiving, from the eNB, a downlink data channel and a front loaded reference signal for demodulation of the downlink data channel by using control information included in the downlink control channel, wherein resource elements of symbols to which a front loaded reference signal is received are identified by two multiplexing groups or three multiplexing groups, and the downlink control channel includes information on a multiplexing group, to which the front loaded reference signal is allocated, among the multiplexing groups, and information on the number of multiplexing groups, to which data are not allocated, among the multiplexing groups.

Meanwhile, according to one aspect of the present invention, a user equipment (UE) in a wireless communication system comprises a wireless communication module; and a processor connected with the wireless communication module, receiving a downlink signal from an eNB, wherein the processor receives, from the eNB, a downlink data channel and a front loaded reference signal for demodulation of the downlink data channel by using control information included in a downlink control channel, resource elements of symbols to which a front loaded reference signal is received are identified by two multiplexing groups or three multiplexing groups, and the downlink control channel includes information on a multiplexing group, to which the front loaded reference signal is allocated, among the multiplexing groups, and information on the number of multiplexing groups, to which data are not allocated, among the multiplexing groups.

Preferably, if the number of the multiplexing groups is three and the number of the multiplexing groups to which the data are not allocated is one, the multiplexing group to which the data are not allocated is a multiplexing group of a low index.

Additionally, the UE receives the downlink data channel under the assumption that the front loaded reference signal is power boosted as much as a specific multiple, and the specific multiple is a difference value between the number of the multiplexing groups and the number of the multiplexing groups to which the data are not allocated.

Moreover, the downlink control channel may further include information on the number of symbols for the front loaded reference signal. Particularly, if the number of symbols for the front loaded reference signal is two or more, the information on a multiplexing group to which the front loaded reference signal is allocated and the information on the number of multiplexing groups to which data are not allocated are commonly applied to the two or more symbols.

Advantageous Effects

According to the embodiment of the present invention, a DM-RS may more efficiently be transmitted in a next generation communication system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

FIG. 2 is a diagram illustrating structures of a control plane and a user plane of a radio interface protocol between a UE and an evolved UMTS terrestrial radio access network (E-UTRAN) based on the 3GPP radio access network specification.

BEST MODE FOR CARRYING OUT THE INVENTION

Figure 1:
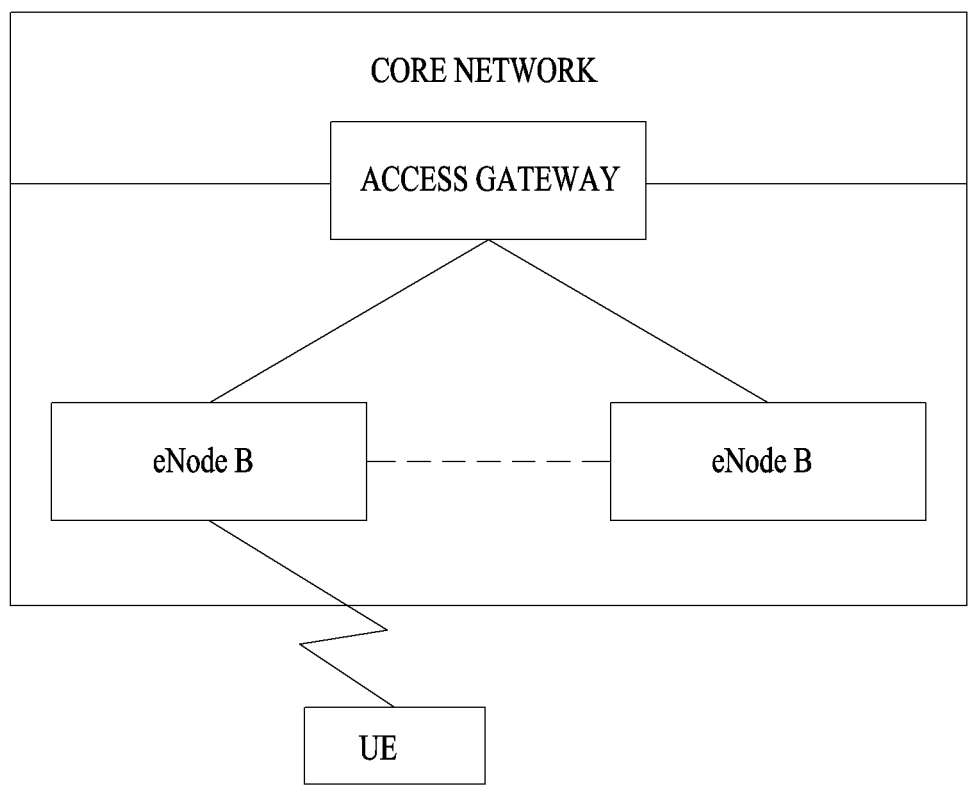
FIG. 1 is a diagram schematically illustrating a network structure of an evolved universal mobile telecommunications system (E-UMTS) as an exemplary radio communication system.

The configuration, operation and other features of the present invention will be understood by the embodiments of the present invention described with reference to the accompanying drawings. The following embodiments are examples of applying the technical features of the present invention to a 3rd Generation Partnership Project (3GPP) system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition.

In the present disclosure, a base station (eNB) may be used as a broad meaning including a remote radio head (RRH), an eNB, a transmission point (TP), a reception point (RP), a relay, etc.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
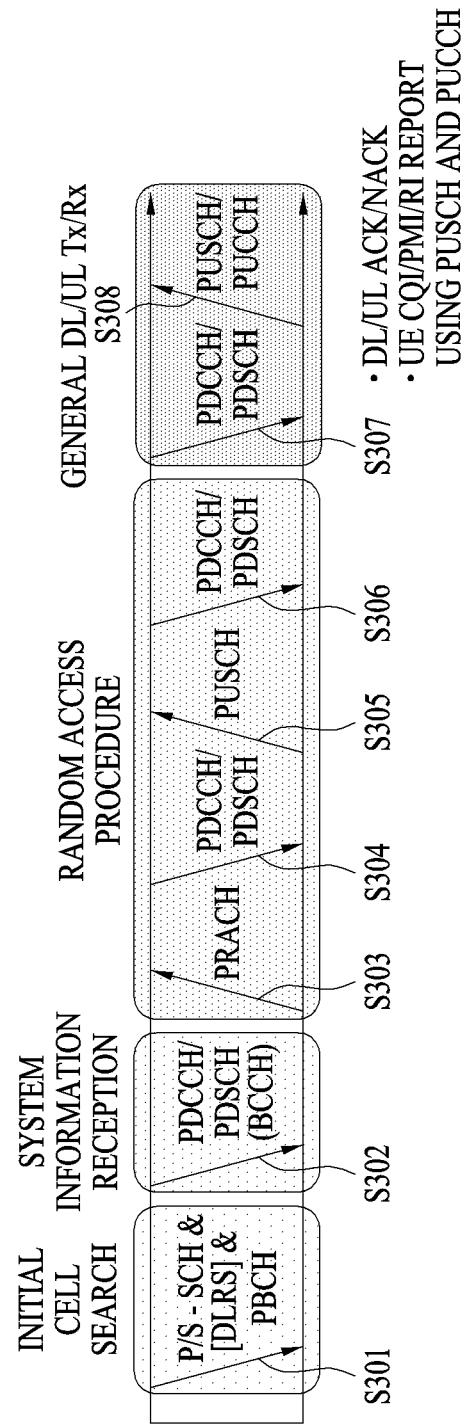
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
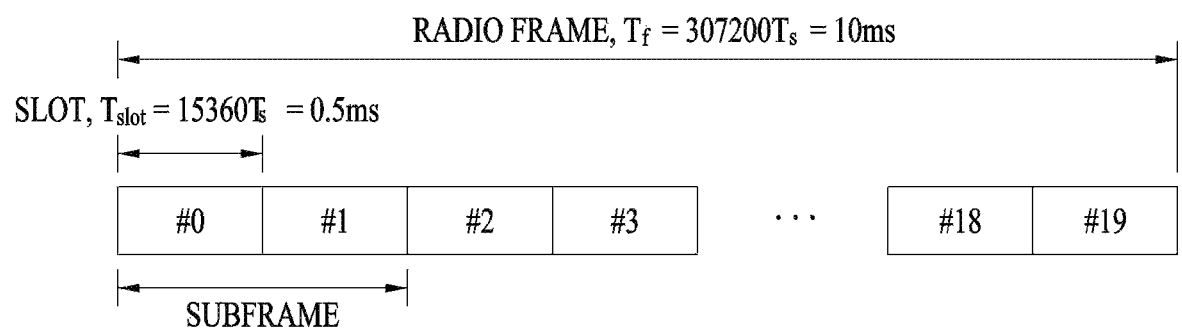
FIG. 4 is a diagram illustrating the structure of a radio frame used in a long term evolution (LTE) system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360 Ts). In this case, Ts denotes a sampling time represented by Ts=1/(15 kHz× 2048)=3.2552×10$^{-8}$ (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
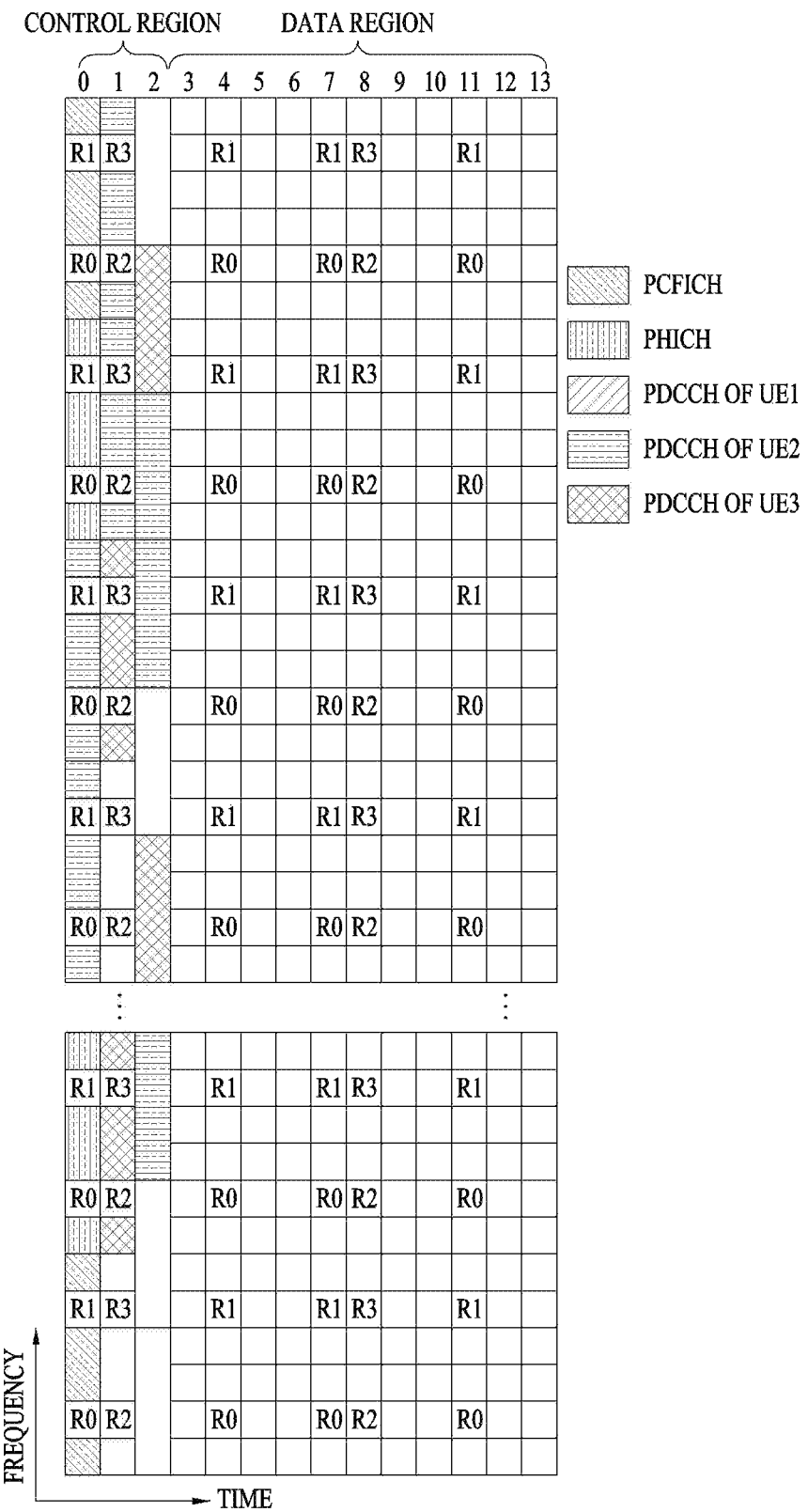
FIG. 5 is a diagram illustrating the structure of a DL radio frame used in an LTE system.

FIG. 5 is a diagram illustrating control channels included in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R0 to R3 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
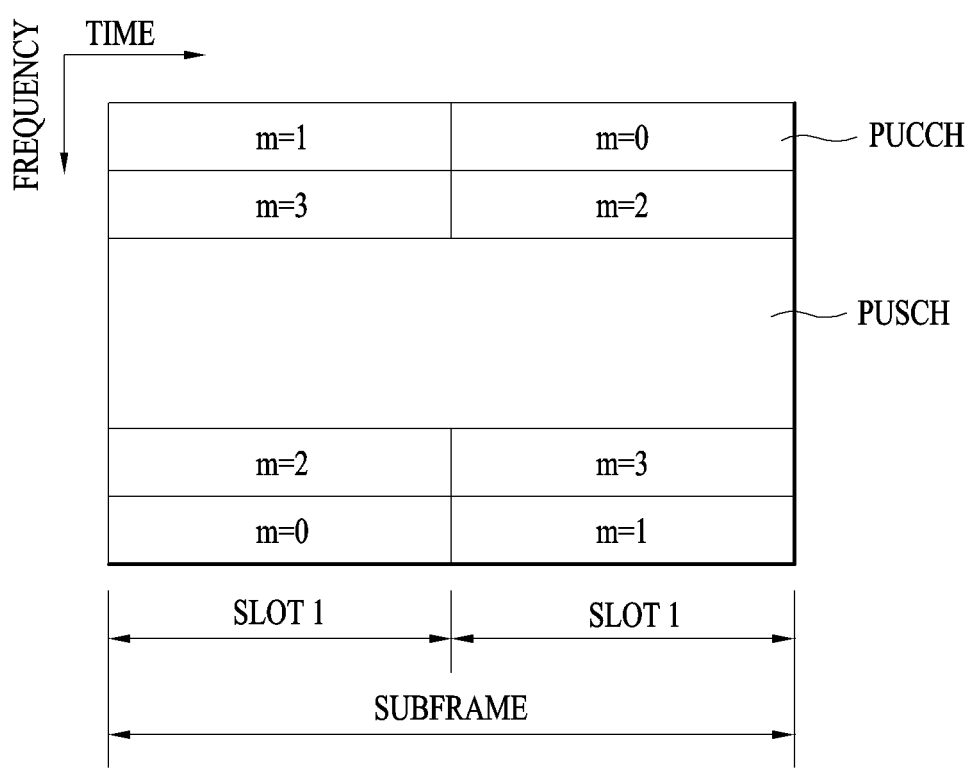
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

Hereinafter, channel state information (CSI) reporting will be described below. In the current LTE standard, there are two MIMO transmission schemes, open-loop MIMO operating without channel information and closed-loop MIMO operating with channel information. Particularly in the closed-loop MIMO, each of an eNB and a UE may perform beamforming based on CSI to obtain the multiplexing gain of MIMO antennas. To acquire CSI from the UE, the eNB may command the UE to feed back CSI on a downlink signal by allocating a PUCCH (Physical Uplink Control CHannel) or a PUSCH (Physical Uplink Shared CHannel) to the UE.

The CSI is largely classified into three information types, RI (Rank Indicator), PMI (Precoding Matrix), and CQI (Channel Quality Indication). First of all, the RI indicates rank information of a channel as described above, and means the number of streams that may be received by a UE through the same time-frequency resources. Also, since the RI is determined by long-term fading of a channel, the RI may be fed back to an eNB in a longer period than a PMI value and a CQI value.

Second, the PMI is a value obtained by reflecting spatial characteristics of a channel, and indicates a precoding matrix index of an eNB, which is preferred by the UE based on a metric such as signal to interference and noise ratio (SINR). Finally, the CQI is a value indicating channel strength, and generally means a reception SINR that may be obtained by the eNB when the PMI is used.

In the 3GPP LTE-A system, the eNB may configure a plurality of CSI processes for the UE, and may be reported CSI for each of the CSI processes. In this case, the CSI process includes CSI-RS resource for specifying signal quality and CSI-IM (interference measurement) resource, that is, IMR (interference measurement resource) for interference measurement.

Since a wavelength becomes short in the field of Millimeter Wave (mmW), a plurality of antenna elements may be installed in the same area. In more detail, a wavelength is 1 cm in a band of 30 GHz, and a total of 64 (8×8) antenna elements of a 2D array may be installed in a panel of 4 by 4 cm at an interval of 0.5 lambda (wavelength). Therefore, a recent trend in the field of mmW attempts to increase coverage or throughput by enhancing BF (beamforming) gain using a plurality of antenna elements.

In this case, if a transceiver unit (TXRU) is provided to control a transmission power and phase per antenna element, independent beamforming may be performed for each frequency resource. However, a problem occurs in that effectiveness is deteriorated in view of cost when TXRU is provided for all of 100 antenna elements. Therefore, a scheme is considered, in which a plurality of antenna elements are mapped into one TXRU and a beam direction is controlled by an analog phase shifter. Since this analog beamforming scheme may make only one beam direction in a full band, a problem occurs in that frequency selective beamforming is not available.

As an intermediate type of digital BF and analog BF, a hybrid BF having B TXRUs smaller than Q antenna elements may be considered. In this case, although there is a difference depending on a connection scheme of B TXRUs and Q antenna elements, the number of beam directions that enable simultaneous transmission is limited to B or less.

Figure 7:
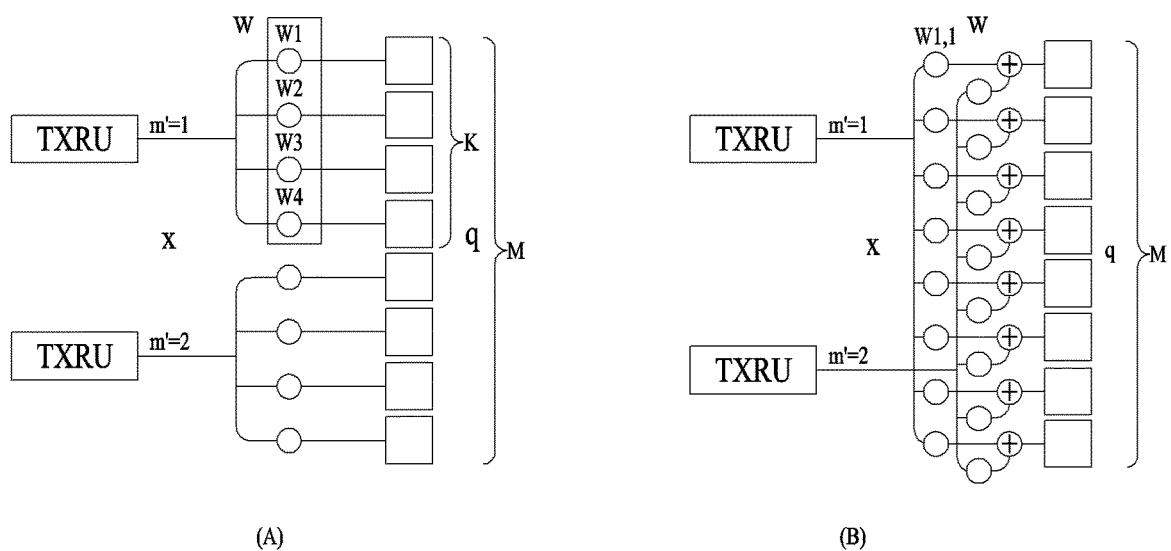
FIG. 7 is a diagram illustrating examples of a connection scheme between TXRUs and antenna elements.

FIG. 7 illustrates examples of a connection scheme between TXRUs and antenna elements.

(A) of FIG. 7 illustrates that TXRU is connected to a sub-array. In this case, the antenna elements are connected to only one TXRU. Unlike (A) of FIG. 7, (B) of FIG. 7 illustrates that TXRU is connected to all antenna elements. In this case, the antenna elements are connected to all TXRUs. In FIG. 7, W indicates a phase vector multiplied by an analog phase shifter. That is, a direction of analog beamforming is determined by W. In this case, mapping between CSI-RS antenna ports and TXRUs may be 1-to-1 or 1-to-many.

As more communication devices require greater communication capacity, the need of mobile broadband communication more advanced than the conventional RAT (radio access technology) has been issued. Also, massive MTC (Machine Type Communications) technology that provides various services anywhere and at any time by connecting a plurality of devices and things is one of main issues which will be considered in next generation communication. Furthermore, a communication system design considering service/UE susceptible to reliability and latency has been discussed. Considering this status, the introduction of the next generation RAT has been discussed, and the next generation RAT will be referred to as NewRAT in the present invention.

Figure 8:
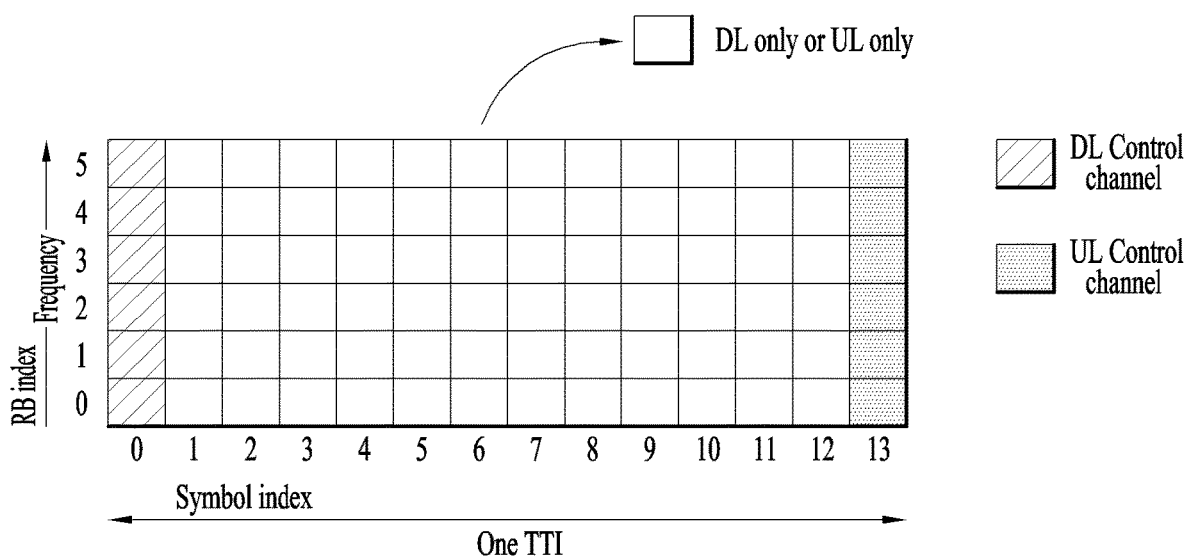
FIG. 8 is a diagram illustrating an example of a self-contained subframe structure.

A self-contained subframe structure shown in FIG. 8 is considered in the fifth generation NewRAT to minimize data transmission latency in a TDD system. FIG. 8 illustrates an example of a self-contained subframe structure.

In FIG. 8, oblique line areas indicate downlink control regions and black colored areas indicate uplink control regions. Areas having no mark may be used for downlink data transmission or uplink data transmission. In this structure, downlink transmission and uplink transmission are performed in due order within one subframe, whereby downlink data may be transmitted and uplink ACK/NACK may be received within the subframe. As a result, the time required for data re-transmission may be reduced when an error occurs in data transmission, whereby latency of final data transfer may be minimized.

In this self-contained subframe structure, a time gap for switching from a transmission mode to a reception mode or vice versa is required for the eNB and the UE. To this end, some OFDM symbols (OS) at the time when a downlink is switched to an uplink in the self-contained subframe structure are set to a guard period (GP).

Examples of the self-contained subframe type that may be configured in the system operating based on the NewRAT may consider four subframe types as follows.

downlink control period+downlink data period+GP+uplink control period
downlink control period+downlink data period
downlink control period+GP+uplink data period+uplink control period
downlink control period+GP+uplink data period A structure that a DM-RS is transmitted from a front OFDM symbol of a slot is reflected in the current NR system. This will be referred to as a slot front allocation structure (front loaded DM-RS only structure). Also, a case that a DM-RS is transmitted to a front OFDM symbol of a slot and additionally transmitted even from a rear OFDM symbol of the slot is also implemented. That is, additional DM-RS is added in the front loaded DM-RS only structure.

The present invention suggests a method for enabling an eNB to notify a UE of downlink DM-RS information through DCI (Downlink Control Information) or a higher layer signal such as MAC/RRC layer signal if the UE receives a DM-RS to decode data information and control information. The present invention may be applied to a method for enabling an eNB to notify a UE of uplink DM-RS information through DCI.

First Embodiment

In the first embodiment of the present invention, if a DM-RS comb value (that is, RPF (repetition factor)) is 2, 8-port DM-RS design based on CDM as illustrated in Table 1 below and a method for signaling port information per rank will be described.

TABLE 1

|        | CDM 1 (or 5) | CDM 2 (or 6) | CDM 3  | CDM 4  |
|--------|--------------|--------------|--------|--------|
| Comb 1 | Port 1       | Port 2       | Port 5 | Port 7 |
| Comb 2 | Port 3       | Port 4       | Port 6 | Port 8 |

In the first embodiment, port {1,2,5,7} and port {3,4,6,8} are subjected to FDM using two combs of a frequency axis. For example, RE of an even index may configure comb 1, and RE of an odd index may configure comb 2. Alternatively, RE bundling may be applied to configure comb. For example, two adjacent REs may be grouped into one RE bundle, and comb is applied in a unit of bundled RE. In this case, if RE 0 to RE 11 exist to configure one RB, RE (0,1), (4,5), (8,9) configure comb 1, and RE (2,3), (6,7), (10,11) configure comb 2.

Ports are multiplexed in each comb based on CDM. CDM 1 to CDM 6 are generated in a frequency domain or frequency and time domains. For example, CDM 1 to CDM 6 may be defined in the frequency domain only, and may be defined using CS (cyclic shift) of DM-RS sequence or OCC (Orthogonal Cover Code) of a length 6 such as Walsh code. In this case, the eNB indicates, to the UE, whether to use only one front loaded DM-RS symbol or whether to use two symbols to repeatedly transmit DM-RS of the first symbol to the second symbol. The corresponding information may be indicated by being joint encoded to DM-RS information within a DCI field, and it is assumed that the corresponding information is indicated whether to be repeated or not in rank N (for example, N=4 or 6) or less and is always repeated in rank N or more.

In case of SU (Single User) MIMO transmission of rank N or less, if DM-RS is repeated, DM-RS overhead is too increased in accordance with use of two symbols and DM-RS should be received over two symbols, whereby decoding latency is generated and thus throughput may be degraded. Under the circumstances, it is preferable that DM-RS is not repeated. On the contrary, in case of MU (Multi User) MIMO transmission, since it is preferable that DM-RS is repeated to increase a total rank, the eNB may activate or inactivate whether to perform repetition depending on SU/MU. However, it is assumed that repetition is always performed in rank N or more because throughput gain is obtained when DM-RS overhead is increased by repetition even in case of SU MIMO transmission.

Through the aforementioned scheme, the number of front loaded DM-RS symbols is joint-encoded to DM-RS information within the DCI field in rank N or less, and if DM-RS is transmitted to two DM-RS symbols, the DM-RS symbols may be repeated/spread on a time axis through OCC [1 1] or repeated/spread through OCC [1 −1]. In excess of rank N, two DM-RS symbols are always used.

Alternatively, CDM 1 to CDM 6 may be defined in the frequency domain and the time domain, and CDM 1 and CDM 2 are identified from each other through OCC of a length 2 in the time domain, CDM 5 and CDM 6 are identified from each other through OCC of a length 2 in the time domain, CDM 1, CDM 3 and CDM 5 are identified from one another through three CS or OCC of a length 3 in the frequency domain, and CDM 2, CDM 4 and CDM 6 are identified from one another through three CS or OCC of a length 3 in the frequency domain. That is, ports may be defined by being categorized into F-CDM and T-CDM as listed in Table 2 below.

TABLE 2

|        | FCDM 1 (or 3) TCDM 1 | FCDM 1 (or 3) TCDM 2 | FCDM 2 TCDM 1 | FCDM 1 (or 3) TCDM 2 |
|--------|----------------------|----------------------|---------------|----------------------|
| Comb 1 | Port 1               | Port 2               | Port 5        | Port 7               |
| Comb 2 | Port 3               | Port 4               | Port 6        | Port 8               |

In Table 1, CDM 1 indicates combination of FCDM1 and TCDM1, CDM 2 indicates combination of FCDM1 and TCDM2, and CDM 3 indicates combination of FCDM2 and TCDM1. Also, CDM 4 indicates combination of FCDM2 and TCDM2, CDM 5 indicates of FCDM3 and TCDM1, and CDM 6 indicates combination of FCDM3 and TCDM2.

Additionally, the eNB may indicate, to the UE, whether to use three CS (or OCC of a length 3) or two CS (or OCC of a length 2) in the frequency domain. In case of SU MIMO transmission, since throughput may be degraded when three CS (or OCC of a length 3) are used, it is preferable that two CS (or OCC of a length 2) are used. However, CDM 5 and CDM 6 are omitted, and FCDM3 corresponding to CDM 5 and CDM 6 is omitted. In case of MU MIMO transmission, since it is preferable that three CS (or OCC of a length 3) are used to increase a total rank, the eNB indicates a corresponding value depending on SU MIMO/MU MIMO.

Alternatively, CDM 1 to CDM 6 may be defined in the frequency domain and the time domain, and are identified from one another through CS or OCC of a length 6 per a total of 6 REs which include 3 adjacent REs on a frequency axis within the same comb with respect to each of two symbols.

In this case, the eNB may indicate, to the UE, whether to use CS or OCC of a length 6 per a total of 6 REs which include three adjacent REs on a frequency axis within the same comb with respect to each of two symbols, or whether to use CS or OCC of a length 4 per a total of 4 REs which include two adjacent REs on a frequency axis within the same comb with respect to each of two symbols.

In case of SU MIMO transmission, since throughput may be degraded when the former case is used, it is preferable to use the latter case. In case of MU MIMO transmission, since it is preferable that the former case is used to increase a total rank, the eNB indicates a corresponding value depending on SU MIMO transmission or MU MIMO transmission. Likewise, even when CDM 1 to CDM 6 are defined in the frequency domain only, OCC length may be indicated.

Since port 1 and port 2 use the same comb, when rank 1 is extended to rank 2, additional DM-RS overhead is not generated. Since another comb is used from rank 3, additional DM-RS overhead is generated. This structure causes overhead increase from rank 3 similarly to DM-RS of the LTE system. As a result, since low DM-RS overhead is maintained in rank 2 or less to make sure of many data REs, gain may be obtained in view of spectral efficiency, and gain is obtained in improvement of channel estimation performance using DM-RS power boosting in rank 3 or more.

It is preferable that additional CDM is selected in ports (that is, port 1 to port 4) of a low index to enable MU MIMO in maximum rank 12. That is, port 1 to port 3 may select CDM 5 in addition to CDM 1. That is, ports 2 and 4 may select CDM 6 in addition to CDM 2. This CDM selection may be joint encoded together with port information and delivered to the DCI field to which DM-RS information is basically delivered. However, to prevent DCI overhead from being increased, CDM which will be used by port 1 to port 4 may be indicated UE-specifically through a higher layer signal such as RRC/MAC. In this case, since CDM information is not changed dynamically, MU MIMO scheduling may be restricted.

Referring to Table 1 again, port 1 to port 8 may be indicated to the UE, and CDM information is additionally indicated to port 1 to port 4, whereby each UE uses the CDM information to increase maximum orthogonal MU MIMO rank. If the eNB considers maximum rank 8 MU MIMO only without performing rank 12 MU MIMO, the eNB notifies the UE of DM-RS information except that CDM 5 or 6 is used, through more compact DCI. The eNB notifies the UE whether to indicate compact DM-RS information based on a DM-RS table considering maximum 8 MU or indicate normal DM-RS information based on a DM-RS table considering maximum 12 MU, through RRC signal. Therefore, DCI payload is varied.

In more detail, ports 1 to 8 are indicated to the UE in rank 1, and CDM information is additionally indicated in ports 1 to 4, whereby each UE may perform MU MIMO transmission for a total of 12 UEs when performing rank 1 transmission.

Ports (1,2), (3,4), (5,6), (7,8) are indicated in rank 2, and CDM information is additionally indicated in ports 1 to 4, whereby maximum rank that may be supported in MU MIMO is increased. In case of (5,6) or (7,8) in rank 2, two combs are used during rank 2 transmission in view of one UE, whereas in case of (1,2) or (3,4) in rank 2, only one comb is used. As a result, since two different implementation schemes should be supported, implementation complexity may be increased. To solve this, in rank 2, (5,7) or (6,8) may be defined instead of (5,6) or (7,8). However, if (5,6) or (7,8) is defined instead of (5,6) or (7,8), restrictions in supporting various MU ranks may occur.

In rank 5, two values may be indicated as follows.
Port 1 (CDM1), port 2 (CDM2), port 3 (CDM1), port 4 (CDM2), port 5
Port 1 (CDM5), port 2 (CDM6), port 3 (CDM5), port 4 (CDM6), port 6

If (5,6) or (7,8) is defined in rank 2, port 1 (CDM5), port 2 (CDM6), port 3 (CDM5), port 4 (CDM6), and port 6 may be defined to support rank 5+5+2=rank 12 MU. On the contrary, if (5,7) or (6,8) instead of (5,6) or (7,8) is defined in rank 2, port 1 (CDM5), port 2 (CDM6), port 3 (CDM5), port 4 (CDM6), and port 7 instead of port 1 (CDM5), port 2 (CDM6), port 3 (CDM5), port 4 (CDM6), and port 6 may be defined to support rank 5+5+2=rank 12 MU. That is, port definition in rank 5 is varied depending on how ports of rank 2 are defined.

In the same manner as rank 5, port definition of rank 6 may be varied depending on definition of rank 2. If (5,6) or (7,8) is defined in rank 2, the followings may be defined:
port 1 (CDM1), port 2 (CDM2), port 3 (CDM1), port 4 (CDM2), port 5, port 6
port 1 (CDM5), port 2 (CDM6), port 3 (CDM5), port 4 (CDM6), port 7, port 8.

As a result, rank 6+2+2+2=rank 12 MU may be supported.

On the contrary, if (5,7) or (6,8) instead of (5,6) or (7,8) is defined in rank 2, the followings may be defined:
port 1 (CDM1), port 2 (CDM2), port 3 (CDM1), port 4 (CDM2), port 5, port 7
port 1 (CDM5), port 2 (CDM6), port 3 (CDM5), port 4 (CDM6), port 6, port 8.

As a result, rank 6+2+2+2=rank 12 MU may be supported.

If a single codeword is used in codeword to layer mapping of rank 4 or less and a double codeword is used in codeword to layer mapping of rank 4 or more, DM-RS information from rank 1 to rank 4 is transmitted in a single codeword, and DM-RS information from rank 5 to rank 8 is transmitted in a double codeword.

If a single codeword is used in codeword to layer mapping of rank 2 or less and a double codeword is used in codeword to layer mapping of rank 2 or more, DM-RS information from rank 1 to rank 2 is transmitted in a single codeword, and DM-RS information from rank 3 to rank 8 is transmitted in a double codeword. However, since rank 3 and rank 4 should be supported even in case of a single codeword during retransmission, a first value of rank 3 and a first value of rank 4 may be indicated even in a single codeword.

In mmWv communication system corresponding to 6 GHz or less, a non-LOS (Line Of Sight) channel includes a weak power due to a strong pathloss. Therefore, when X-pol antenna is used, it is likely that maximum rank may be limited to K (for example, K=2). As a result, the DM-RS field of DCI should be defined in rank K or less among the above rank information. Therefore, the eNB defines a DM-RS field comprised of rank K or less within DCI and signals the defined DM-RS field to the UE. The eNB may notify the UE that the corresponding DM-RS field has been used, through a higher layer control signal, that is, RRC signaling/MAC signaling. Alternatively, the eNB and the UE may mutually agree that the DM-RS field is used provided that mmWv communication is performed in accordance with carrier frequency.

If a single codeword is used for 4 layers or less in accordance with codeword to layer mapping and two codewords are used for more than 4 layers, the eNB may signal whether to define one or two of MCS/RV/NDI fields to reduce DCI payload, through RRC signaling. For example, if eNB antennas are 4 or less or UE antennas are 4 or less, since a single codeword is always used, one of MCS/RV/NDI fields may be defined.

The DM-RS field within DCI, that is, DM-RS table may be varied by RRC signaling indicating the number of MCS/RV/NDI fields. For example, the number of MCS/RV/NDI fields is 1, the DM-RS table is configured by rank 4 or less, and the corresponding table is delivered through DCI. On the contrary, if the number of MCS/RV/NDI fields is 2, the DM-RS table is configured by rank 8 or less, and the corresponding table is delivered through DCI.

The other RE excluding DM-RS RE of one UE from DM-RS symbol may be used for DM-RS transmission of another UE during MU MIMO transmission with another UE. In this case, data of one UE should rate matched with DM-RS RE of another UE to avoid interference between data and DM-RS. The eNB additionally indicates, to the UE, rate matched DM-RS comb information to indicate rate matching. The UE is indicated, from the eNB, a comb which should be rate matched excluding comb in which DM-RS of the UE exists. (That is, the UE is indicated whether data is not transmitted.) For example, if three combs exist (that is, RPF=3) and DM-RS of the eNB exists in comb 0, the eNB should notify the UE of comb 1 or comb 2 with which data is rate matched. On the contrary, the eNB may notify the UE of a comb (and a total of combs) of DM-RS symbol, to which data/control information is transmitted.

If RPF is N and data or another RS (for example, SRS or CSI-RS) is transmitted to K combs, the UE decodes data by assuming that each DM-RS port is power boosted as much as N-K times. Likewise, power boosting is applied to even a case that comb is defined in a unit of two bundled REs. For example, if two combs (that is, RPF=2) are used in a unit of two bundled REs, it means that REs (0,1), (4,5), and (8,9) configure comb 1, and the other REs (2,3), (6,7), and (10,11) configure comb 2.

If ZP CSI-RS is used for data rate matching, RE corresponding to a specific DM-RS comb cannot be represented by ZP CSI-RS. This is because that RE pattern of the ZP CSI-RS is different from DM-RS. Therefore, the ZP CSI-RS should be indicated by a super set of REs that includes DM-RS comb which is a target for rate matching. In this case, the UE assumes that DM-RS not muting is transmitted to RE where the ZP CSI-RS is superposed with DM-RS of the UE.

OCC length, the number of DM-RS symbols, whether to apply OCC in a time domain, whether to apply repetition in a time domain, nSCID, virtual cell ID, information as to a comb which is used by DM-RS to be received (or transmitted) by the corresponding UE, and comb information to which data (or control information) of DM-RS symbol is transmitted (in detail, information as to a comb to which data is transmitted and information as to how many combs to which data is transmitted) may be indicated by being joint encoded together with the aforementioned DM-RS information, and information on the number of layers instead of rank information may be indicated as DM-RS information.

Detailed suggestions of the first embodiment may equally be applied to the following embodiments. In the following embodiments, the same description as the detailed suggestions of the first embodiments will be omitted to avoid repetition of description.

Second Embodiment

The following Table 3 illustrates DM-RS configuration according to the second embodiment of the present invention.

TABLE 3

|  | CDM 1 (or 5) | CDM 2 (or 6) | CDM 3 | CDM 4 |
| --- | --- | --- | --- | --- |
| Comb 1 | port 1 | port 3 | port 5 | port 7 |
| Comb 2 | port 2 | port 4 | port 6 | port 8 |

In comparison with the first embodiment, ports 1 and 2 are configured by their respective combs different from each other in the second embodiment, whereby DM-RS overhead is increased twice when rank 1 is increased to rank 2. In this case, in the second embodiment unlike the first embodiment, ports port (5,7), (6.8) are meaningless in port indication of rank 2 and thus removed.

CDM 1 to CDM 6 may be defined in the frequency and time domains, and CDM 1 and CDM 2 are identified from each other in the time domain through OCC of a length 2, CDM 3 and CDM 4 are identified from each other in the time domain through OCC of a length 2, CDM 5 and CDM 6 are identified from each other in the time domain through OCC of a length 2, CDM 1, CDM 3 and CDM 5 are identified from one another in the frequency domain through three CS or OCC of a length 3, and CDM 2, CDM 4 and CDM 6 are identified from one another in the frequency domain through three CS or OCC of a length 3. That is, ports may be defined by being categorized into F-CDM and T-CDM as listed in Table 4 below.

TABLE 4

|  | FCDM 1 (or 3) TCDM 1 | FCDM 1 (or 3) TCDM 2 | FCDM 2 TCDM 1 | FCDM 2 TCDM 2 |
| --- | --- | --- | --- | --- |
| Comb 1 | port 1 | port 3 | port 5 | port 7 |
| Comb 2 | port 2 | port 4 | port 6 | port 8 |

That is, CDM 1 indicates combination of FCDM1 and TCDM1, CDM 2 indicates combination of FCDM1 and TCDM2, and CDM 3 indicates combination of FCDM2 and TCDM1. Also, CDM 4 indicates combination of FCDM2 and TCDM2, CDM 5 indicates of FCDM3 and TCDM1, and CDM 6 indicates combination of FCDM3 and TCDM2.

Third Embodiment

The following Table 5 illustrates DM-RS configuration according to the third embodiment of the present invention.

TABLE 5

|  | CDM 1 | CDM 2 | CDM 3 |
| --- | --- | --- | --- |
| Comb 1 | port 1 (CDM 1 or CDM 4) | port 2 | port 7 |
| Comb 2 | port 3 (CDM 1 or CDM 4) | port 4 | port 8 |
| Comb 3 | port 5 |  | port 6 |

In the third embodiment, port (1, 2, 7), port (3,4,8) and port (5,6) are subjected to FDM by three combs of a frequency axis. For example, comb i may include RE which satisfies RE index % 3+1=i.

Alternatively, RE bundling may be applied to configure comb. For example, two adjacent REs may be grouped into one RE bundle, and comb is applied in a unit of bundled RE. In this case, if RE 0 to RE 11 exist to configure one RB, RE (0,1), (6,7) are defined as comb 1, RE (2,3), (8,9) are defined as comb 2, and RE (4,5), (10,11) are defined as comb 3.

Ports are multiplexed in each comb through CDM. CDM 1 to CDM 4 are generated in a frequency domain or frequency and time domains.

For example, CDM 1 to CDM 4 may be defined in the frequency domain only, and may be defined using CS of DM-RS sequence or OCC of a length 4. In this case, the eNB indicates, to the UE, whether to use only one front loaded DM-RS symbol or whether to use two symbols to repeatedly transmit DM-RS of the first symbol to the second symbol. The corresponding information may be indicated by being joint encoded to DM-RS information within a DCI field, and it is assumed that the corresponding information is indicated whether to be repeated or not in rank N (for example, N=4 or 6) or less and is always repeated in rank N or more.

In case of SU MIMO transmission of rank N or less, since repetition may degrade throughput, it is preferable that repetition is not performed. In case of MU MIMO transmission, since it is preferable that repetition is performed to increase a total rank, the eNB performs repetition on/off depending on SU MIMO transmission or MU MIMO transmission. On the contrary, it is assumed that repetition is always performed in rank N or more because throughput gain is obtained when DM-RS overhead is increased by repetition even in case of SU MIMO transmission.

Through the aforementioned scheme, the number of front loaded DM-RS symbols is joint-encoded to DM-RS information within the DCI field in rank N or less, and if DM-RS is transmitted to two DM-RS symbols, the DM-RS symbols may be repeated/spread on a time axis through OCC [1 1] or repeated/spread through OCC [1 −1]. In excess of rank N, two DM-RS symbols are always used. Otherwise, considering that one port reserves four REs from one symbol, it is assumed that repetition is performed by always using two symbols regardless of SU MIMO transmission or MU MIMO transmission to prevent throughput degradation caused by low RS density from occurring.

Alternatively, CDM 1 to CDM 4 may be defined in the frequency domain and the time domain, and CDM 1 and CDM 2 are identified from each other through OCC of a length 2 in the time domain, CDM 3 and CDM 4 are identified from each other through OCC of a length 2 in the time domain, CDM 1 and CDM 3 are identified from each other through two CS or OCC of a length 2 in the frequency domain, and CDM 2 and CDM 4 are identified from each other through two CS or OCC of a length 2 in the frequency domain. That is, CDM 1 indicates combination of FCDM1 and TCDM1, CDM 2 indicates combination of FCDM1 and TCDM2, CDM 3 indicates combination of FCDM2 and TCDM1, and CDM 4 indicates combination of FCDM2 and TCDM2.

For another example, CDM 1 to CDM 4 may be defined in the frequency domain and the time domain, and are identified from one another through CS or OCC of a length 4 per a total of 4 REs which include 2 adjacent REs on a frequency axis within the same comb with respect to each of two symbols.

Since port 1 and port 2 use the same comb, when rank 1 is extended to rank 2, additional DM-RS overhead is not generated. However, since another comb is used from rank 3, additional DM-RS overhead is generated. In detail, in rank 3 and rank 4, DM-RS overhead is increased twice as compared with rank 1, and is increased three times in rank 5 or more as compared with rank 1. As a result, since low DM-RS overhead is maintained in rank 2 or less to make sure of many data REs, gain may be obtained in view of spectral efficiency, and gain is obtained in improvement of channel estimation performance using DM-RS power boosting in rank 3 or more.

It is preferable that additional CDM is selected in ports of a low index, that is, ports 1 to 4, to enable MU MIMO in maximum rank 12. That is, port 1 and port 3 may select CDM 4 in addition to CDM 1, and ports 2 and 4 may select CDM 4 in addition to CDM 2. This CDM selection may be joint encoded together with port information and delivered to the DCI field to which DM-RS information is basically delivered. However, to prevent DCI overhead from being increased, CDM which will be used by port 1 to port 4 may be indicated UE-specifically through a higher layer signal such as RRC/MAC. In this case, since CDM information is not changed dynamically, MU MIMO scheduling may be restricted.

In Table 5, port values that may be indicated to the UE are listed per rank, and port 1 to port 8 may be indicated to the UE, and CDM information is additionally indicated to port 1 to port 4, whereby each UE uses the CDM information to increase maximum orthogonal MU MIMO rank. If the eNB considers maximum rank 8 MU MIMO only without performing rank 12 MU MIMO, the eNB notifies the UE of DM-RS information except that CDM 5 or 6 is used, through more compact DCI. The eNB notifies the UE whether to indicate compact DM-RS information based on a DM-RS table considering maximum 8 MU or indicate normal DM-RS information based on a DM-RS table considering maximum 12 MU, through RRC signal. Therefore, DCI payload is varied.

Fourth Embodiment

The following Table 6 illustrates DM-RS configuration according to the fourth embodiment of the present invention.

TABLE 6

|  | CDM 1 | CDM 2 | CDM 3 |
|---|---|---|---|
| Comb 1 | port 1 (CDM 1 or CDM 4) | port 4 (CDM 2 or CDM 4) | port 7 |
| Comb 2 | port 2 (CDM 1 or CDM 4) | port 5 | port 8 |
| Comb 3 | port 3 (CDM 1 or CDM 4) | port 6 |  |

In comparison with the third embodiment, port index is increased and comb is sequentially increased in the fourth embodiment. That is, port 1 is defined as comb 1, port 2 is defined as comb 2, port 3 is defined as comb 3, and port 4 is again defined as comb 1. In comparison with the third embodiment, port 2 of the fourth embodiment uses one of CDM 1 and CDM 4.

Fifth Embodiment

The following Table 7 illustrates DM-RS configuration according to the fifth embodiment of the present invention.

TABLE 7

|  | CDM 1 | CDM 2 |
|---|---|---|
| Comb 1 | port 1 (CDM 1 or CDM 3) | port 2 |
| Comb 2 | port 3 (CDM 1 or CDM 3) | port 4 |
| Comb 3 | port 5 (CDM 1 or CDM 3) | port 6 |
| Comb 4 | port 7 (CDM 1 or CDM 3) | port 8 |

In the fifth embodiment, port (1, 2, 7), port (3,4), port (5,6) and port (7,8) are subjected to FDM by four combs of a frequency axis. For example, comb i may include RE which satisfies RE index % 4+1=i. Alternatively, RE bundling may be applied to configure comb. For example, three adjacent REs may be grouped into one RE bundle, and comb is applied in a unit of bundled RE.

Ports are multiplexed in each comb through CDM. CDM 1 to CDM 3 are generated in a frequency domain or frequency and time domains.

For example, CDM 1 to CDM 3 may be defined in the frequency domain only, and may be defined using three CS or OCC of a length 3. Considering that one port reserves three REs from one symbol, it may be defined that repetition is performed by always using two symbols regardless of SU MIMO transmission or MU MIMO transmission to prevent throughput degradation caused by low RS density from occurring. If the eNB manages only SU MIMO or manages only MU MIMO of rank 8 or less, since CDM 3 is not required, CDM 1 and CDM 2 only exist. In this case, two CS or OCC of a length 2 is used in the frequency domain. The eNB may indicate, to the UE, whether to support MU MIMO transmission of maximum rank 12 or MU MIMO transmission of maximum rank 8, whereby the OCC length and the number of CS are varied.

For another example, CDM 1 to CDM 3 may be defined in the frequency domain and the time domain, and CDM 1 and CDM 2 are identified from each other through OCC of a length 2 in the time domain, CDM 2 and CDM 3 are identified from each other through OCC of a length 2 in the time and frequency domains, and CDM 1 and CDM 3 are identified from each other through two CS or OCC of a length 2 in the frequency domain. That is, CDM 1 indicates combination of FCDM1 and TCDM1, CDM 2 indicates combination of FCDM1 and TCDM2, and CDM 3 indicates combination of FCDM2 and TCDM1. If the eNB manages only SU MIMO or manages only MU MIMO of rank 8 or less, CDM 1 and CDM 2 only exist. In this case, only CDM of the time domain exists. The eNB may indicate, to the UE, whether to support MU MIMO transmission of maximum rank 12 or MU MIMO transmission of maximum rank 8, whereby only CDM of the time domain may exist.

For another example, CDM 1 to CDM 3 may be defined in the frequency domain and the time domain, and are identified from one another through CS or OCC of a length 4 per a total of 4 REs which include 2 adjacent REs on a frequency axis within the same comb with respect to each of two symbols.

Since port 1 and port 2 use the same comb, when rank 1 is extended to rank 2, additional DM-RS overhead is not generated. Since another comb is used from rank 3, additional DM-RS overhead may be generated. That is, in rank 3 and rank 4, DM-RS overhead is increased twice as compared with rank 1, is increased three times in rank 5 and rank 6 as compared with rank 1, and is increased four times in rank 7 and rank 8. As a result, since low DM-RS overhead is maintained in rank 2 or less to make sure of many data REs, gain may be obtained in view of spectral efficiency, and gain is obtained in improvement of channel estimation performance using DM-RS power boosting in rank 3 or more.

It is preferable that additional CDM is selected in ports 1, 3, 5 and 7 to enable MU MIMO in maximum rank 12. That is, port 1, port 3, port 5 and port 7 may select CDM 3 in addition to CDM 1. This CDM selection may be joint encoded together with port information and delivered to the DCI field to which DM-RS information is basically delivered. However, to prevent DCI overhead from being increased, CDM which will be used by port 1, port 3, port 5 and port 7 may be indicated UE-specifically through a higher layer signal such as RRC/MAC. In this case, since CDM information is not changed dynamically, MU MIMO scheduling may be restricted.

In Table 7, port values that may be indicated to the UE are listed per rank, and port 1 to port 8 may be indicated to the UE, and CDM information is additionally indicated to port 1 to port 4, whereby each UE uses the CDM information to increase maximum orthogonal MU MIMO rank. The eNB notifies the UE of DM-RS information except that CDM 3 is used, through more compact DCI without performing rank 12 MU MIMO. The eNB notifies the UE whether to indicate compact DM-RS information based on a DM-RS table considering maximum 8 MU or indicate normal DM-RS information based on a DM-RS table considering maximum 12 MU, through RRC signal. Therefore, DCI payload is varied.

Sixth Embodiment

The following Table 8 illustrates DM-RS configuration according to the sixth embodiment of the present invention.

TABLE 8

|  | CDM 1 | CDM 2 |
|---|---|---|
| Comb 1 | port 1 (CDM 1 or CDM 3) | port 5 |
| Comb 2 | port 2 (CDM 1 or CDM 3) | port 6 |
| Comb 3 | port 3 (CDM 1 or CDM 3) | port 7 |
| Comb 4 | port 4 (CDM 1 or CDM 3) | port 8 |

In the sixth embodiment, port (1,5) and port (2,6), and port (3,7), and port (4,8) are subjected to FDM by four combs of a frequency axis. For example, comb i may include RE which satisfies RE index % 4+1=i. Alternatively, RE bundling may be applied to configure comb. For example, three adjacent REs may be grouped into one RE bundle, and comb is applied in a unit of bundled RE.

Ports are multiplexed in each comb through CDM. CDM 1 to CDM 3 are generated in a frequency domain or frequency and time domains. Details of CDM are the same as those of the fifth embodiment.

In comparison with the fifth embodiment, port index is increased and comb is sequentially increased in the sixth embodiment. That is, port 1 is defined as comb 1, port 2 is defined as comb 2, port 3 is defined as comb 3, port 4 is defined as comb 4, and port 5 is again defined as comb 1.

It is preferable that additional CDM is selected in ports 1 to 4 to enable MU MIMO in maximum rank 12. That is, ports 1 to 4 may select CDM 3 in addition to CDM 1. This CDM selection may be joint encoded together with port information and delivered to the DCI field to which DM-RS information is basically delivered. However, to prevent DCI overhead from being increased, CDM which will be used by ports 1 to 4 may be indicated UE-specifically through a higher layer signal such as RRC/MAC. In this case, since CDM information is not changed dynamically, MU MIMO scheduling may be restricted.

In Table 8, port values that may be indicated to the UE are listed per rank, and port 1 to port 8 may be indicated to the UE, and CDM information is additionally indicated to port 1 to port 4, whereby each UE uses the CDM information to increase maximum orthogonal MU MIMO rank. The eNB notifies the UE of DM-RS information indicating that CDM 3 is used, through more compact DCI if the eNB considers only maximum rank 8 MU MIMO without performing rank 12 MU MIMO. The eNB notifies the UE whether to indicate compact DM-RS information based on a DM-RS table considering maximum 8 MU or indicate normal DM-RS information based on a DM-RS table considering maximum 12 MU, through RRC signal. Therefore, DCI payload is varied.

Seventh Embodiment

The following Table 9 illustrates DM-RS configuration according to the seventh embodiment of the present invention.

TABLE 9

| | CDM 1 or CDM 9 | CDM 2 or CDM 10 | CDM 3 or CDM 11 | CDM 4 or CDM 12 | CDM 5 | CDM 6 | CDM 7 | CDM 8 |
|---|---|---|---|---|---|---|---|---|
| Comb 1 | port 1 | port 2 | port 3 | port 4 | port 5 | port 6 | port 7 | port 8 |

In the seventh embodiment, one comb of a frequency axis is used. Ports are multiplexed through CDM within one comb. CDM 1 to CDM 12 are generated a frequency domain or frequency and time domains.

For example, CDM 1 to CDM 12 may be defined in the frequency domain only, and may be defined using CS of DM-RS sequence or OCC of a length 12. In this case, the eNB indicates, to the UE, whether to use only one front loaded DM-RS symbol or whether to use two symbols to repeatedly transmit DM-RS of the first symbol to the second symbol. The corresponding information may be indicated by being joint encoded to DM-RS information within a DCI field, and it is assumed that the corresponding information is indicated whether to be repeated or not in rank N (for example, N=4 or 6) or less and is always repeated in rank N or more.

In case of SU MIMO transmission of rank N or less, since repetition may degrade throughput, it is preferable that repetition is not performed. In case of MU MIMO transmission, since it is preferable that repetition is performed to increase a total rank, the eNB performs repetition on/off depending on SU MIMO transmission or MU MIMO transmission. On the contrary, it is assumed that repetition is always performed in rank N or more because throughput gain is obtained when DM-RS overhead is increased by repetition even in case of SU MIMO transmission. Through the aforementioned scheme, the number of front loaded DM-RS symbols is joint-encoded to DM-RS information within the DCI field in rank N or less, and if DM-RS is transmitted to two DM-RS symbols, the DM-RS symbols may be repeated/spread on a time axis through OCC [1 1] or repeated/spread through OCC [1-1]. In excess of rank N, two DM-RS symbols are always used.

For another example, CDM 1 to CDM 12 may be defined in the frequency domain and the time domain, and CDM 1 and CDM 2 are identified from each other through OCC of a length 2 in the time domain, CDM 3 and CDM 4 are identified from each other through OCC of a length 2 in the time domain, CDM 5 and CDM 6 are identified from each other through OCC of a length 2 in the time domain, CDM 7 and CDM 8 are identified from each other through OCC of a length 2 in the time domain, CDM 9 and CDM 10 are identified from each other through OCC of a length 2 in the time domain, CDM 11 and CDM 12 are identified from each other through OCC of a length 2 in the time domain, CDM 1, CDM 3, CDM 5, CDM 7, CDM 9 and CDM 11 are identified from one another through 6 CS or OCC of a length 6 in the frequency domain, and CDM 2, CDM 4, CDM 6, CDM 8, CDM 10 and CDM 12 are identified from one another through 6 CS or OCC of a length 6 in the frequency domain. Additionally, the eNB may indicate, to the UE, whether to use six CS (or OCC of a length 6) or four CS (or OCC of a length 4) in the frequency domain. In case of SU MIMO transmission, since throughput may be degraded when six CS (or OCC of a length 6) are used, it is preferable that four CS (or OCC of a length 4) are used. However, in this case, CDM 9 to CDM 12 are not used. In case of MU MIMO transmission, since it is preferable that six CS (or OCC of a length 6) are used to increase a total rank, the eNB indicates a corresponding value depending on SU MIMO transmission or MU MIMO transmission.

For another example, CDM 1 to CDM 12 may be defined in the frequency domain and the time domain, and are identified from one another through CS or OCC of a length 12 per a total of 12 REs which include 6 adjacent REs on a frequency axis within the same comb with respect to each of two symbols. In this case, the eNB may additionally indicate, to the UE, whether to use CS or OCC of a length 12 per a total of 12 REs which include 6 adjacent REs on a frequency axis within the same comb with respect to each of the two symbols, or whether to use CS or OCC of a length 8 per a total of 8 REs which include 4 adjacent REs on a frequency axis within the same comb with respect to each of the two symbols. However, in this case, CDM 9 to CDM 12 are not used. In case of SU MIMO transmission, since throughput may be degraded when the former case is used, it is preferable that the latter case is used. In case of MU MIMO transmission, it is preferable that the former case is used to increase a total rank. Therefore, the eNB indicates a corresponding value depending on SU MIMO transmission or MU MIMO transmission. Likewise, OCC length may be indicated even when CDM 1 to CDM 12 are defined in the frequency domain only.

It is preferable that additional CDM is selected in ports of a low index, that is, ports 1 to 4, to enable MU MIMO in maximum rank 12. This CDM selection may be joint encoded together with port information and delivered to the DCI field to which DM-RS information is basically delivered. However, to prevent DCI overhead from being increased, CDM which will be used by port 1 to port 4 may be indicated UE-specifically through a higher layer signal such as RRC/MAC. In this case, since CDM information is not changed dynamically, MU MIMO scheduling may be restricted.

In Table 9, port values that may be indicated to the UE are listed per rank, and port 1 to port 8 may be indicated to the UE, and CDM information is additionally indicated to port 1 to port 4, whereby each UE uses the CDM information to increase maximum orthogonal MU MIMO rank. If the eNB considers maximum rank 8 MU MIMO only without performing rank 12 MU MIMO, the eNB notifies the UE of DM-RS information except that CDM 5 or 6 is used, through more compact DCI. The eNB notifies the UE whether to indicate compact DM-RS information based on a DM-RS table considering maximum 8 MU or indicate normal DM-RS information based on a DM-RS table considering maximum 12 MU, through RRC signal. Therefore, DCI payload is varied.

Eighth Embodiment

Although it has been assumed that maximum 8 ports may be indicated when DM-RS information such as rank, port and CDM information is signaled through DCI, maximum ports may be set to a value smaller than 8, whereby payload of the DM-RS information may be reduced. For example, a payload size may be reduced in accordance with MIMO capability of the UE, which is information as to how many maximum layers enable IMO transmission/reception. That is, if maximum N-layer (for example, N=4) MIMO is supported, compact DM-RS information comprised of information on N ports is indicated by DCI. Alternatively, if the number of receiving antennas of the UE is N, compart DM-RS information comprised of information on N ports is indicated by DCI.

Also, the eNB indicates, to the UE, whether to use only one front loaded DM-RS symbol or whether to use two symbols to repeatedly transmit DM-RS of the first symbol to the second symbol by applying T-CDM (time domain CDM) to the second symbol. The corresponding information may be indicated by being joint encoded to DM-RS information within a DCI field, and it may be assumed that the corresponding information is indicated in rank N (for example, N=4 or 6) or less and T-CDM is always used for two symbols in rank N or more.

In case of SU MIMO transmission of rank N or less, since throughput may be degraded when two DM-RS symbols are repeated, it is preferable that repetition is not performed. This is because that decoding latency is increased because DM-RS overhead is too increased in accordance with use of two symbols and DM-RS should be received over two symbols. On the contrary, in case of MU MIMO transmission, since it is preferable that two DM-RS symbols are used to increase a total rank and T-CDM is used, the eNB performs repetition on/off depending on SU MIMO transmission or MU MIMO transmission. However, it is assumed that repetition is always performed in rank N or more because throughput gain is obtained when DM-RS overhead is increased using T-CDM with respect to two symbols even in case of SU MIMO transmission.

Through the aforementioned scheme, the number of front loaded DM-RS symbols is joint-encoded and delivered to DM-RS information within the DCI field in rank N or less, and if DM-RS is transmitted to two DM-RS symbols, the DM-RS symbols may be repeated/spread on a time axis through OCC [1 1] or repeated/spread through OCC [1-1]. In excess of rank N, two DM-RS symbols are always used.

If 1 or 2 front loaded DM-RS symbols are set in rank N or less, the UE assumes MU MIMO as follows in accordance with the number of the corresponding symbols.

If two symbols are indicated, the UE does not assume that the other ports (that is, all of the other ports or some ports, which enables MU MIMO, among the other ports) except its DM-RS port are not associated with PDSCH transmitted to another UE. As a result, the UE having MU-IC (Interference Cancellation) capability performs MU-IC by blind-detecting DM-RS ports of the other UE because MU MIMO transmission may be performed if transmission of N layer or less is indicated and two symbols are used for the front loaded DM-RS.

In case of a mini slot, as one slot includes 1 symbol or 2 symbols, a comb is preferably set to have a high value to reduce DM-RS overhead. A range of a comb that may configured for the UE by the eNB in a normal slot is defined differently from a range of a comb that may be configured for the UE by the eNB in a mini slot. For example, although one value of 1 to 4 may be set to RPF in a normal slot, a mini slot may be restricted such that 3 or 4 may only be set to RPF, or may be fixed to a high RPF value, for example, RPF=4.

In the current NR standardization, a DM-RS configuration type 1 which uses 2 combs and a DM-RS configuration type 2 which uses 3 combs in a unit of 2 bundled REs exist. If a slot includes K symbols or less (for example, K=4), or in case of a mini slot, it may be restricted that the DM-RS configuration type 2 having low DM-RS density is only used. In other cases, both the DM-RS configuration type 1 and the DM-RS configuration type 2 may be used.

Alternatively, if additional DM-RS is used, RPF is increased to control DM-RS density or is used by being always fixed to a great value. For example, RPF=2 is used if the front loaded DM-RS only exists, whereas DM-RS pattern of RPF=4 is used if additional DM-RS is configured. This operation is characterized in that RPF value is changed depending on the presence of additional DM-RS. However, more elaborately, the RPF value is preferably changed depending on the number of additional DM-RS.

For example, if one additional DM-RS is configured, RPF is set to 3, and if three DM-RS are configured, RPF is set to 4, whereby DM-RS density compensation according to the increased DM-RS symbols is performed. That is, the RPF value may be fixed depending on the number of additional DM-RS, or a range of the RPF value that may be set may be varied depending on the number of additional DM-RS. In other words, if one additional DM-RS is configured, RPF is set to 2 or 3, and if three DM-RS are configured, RPF is set to 3 or 4, a range of value that may be set may be varied. Likewise, if K additional DM-RS or more are configured (for example, K=2), it may be restricted that the DM-RS configuration type 2 having low DM-RS density is only used. In other cases, both the DM-RS configuration type 1 and the DM-RS configuration type 2 may be used.

Ninth Embodiment

If DM-RS ports are multiplexed using F-CDM and/or T-CDM simultaneously with frequency comb, whether to first use comb or whether to first use CDM should be determined as the number of transport ports (that is, the number of transport layers) is increased. If comb is first used, DM-RS RE overhead is increased due to increase of the number of ports, whereby a problem occurs in that the number of data REs is reduced. However, it is advantageous in that DM-RS channel estimation exactness is increased using power boosting of DM-RS port. On the contrary, if CDM is first used, increase of DM-RS RE overhead is minimized to make sure of maximum data REs, whereas a problem occurs in that DM-RS power boosting is not used to cause low channel estimation exactness. Considering these advantages and disadvantages, whether to first to use comb or whether to first use CDM should be determined, and an example of each case will be described below.

1) If comb is first used, 2 RPFs, that is, 2 combs are used in a unit of two bundled REs when DM-RS is transmitted through one symbol, and F-DCM is applied to two bundled REs, whereby a total of four orthogonal DM-RS ports may be generated. In this case, if comb is used to define port 0 to port 3, the ports are defined as follows.

port 0=comb 1+F-CDM1
port 1=comb 2+F-CDM1
port 2=comb 1+F-CDM2
port 3=comb 2+F-CDM2

2) If CDM is first used, port 0 to port 3 are defined as follows.

port 0=comb 1+F-CDM1
port 1=comb 1+F-CDM2
port 2=comb 2+F-CDM1
port 3=comb 2+F-CDM2

If the number of front loaded DM-RS symbols is 2, the ports are multiplexed using three types of F-CDM/T-CDM/ comb. When port indexes are increased to define port and RE patterns, comb is finally applied and multiplexing schemes are used in the order of F-CDM, T-CDM, and comb. Alternatively, considering that a channel is little changed between two adjacent symbols, multiplexing schemes are used in the order of T-CDM, F-CDM, and comb.

If DM-RS ports are defined using two front loaded symbols, ports are multiplexed using comb/F-CDM/T-CDM together. At this time, T-CDM uses two OCC of (1,1) and (1,−1). At this time, as the number of transport ports (that is, the number of transport layers) is increased, it is preferable that T-CDM of comb/F-CDM/T-CDM is last used. For example, when 12 ports are designed, port 0 to port 5 are defined using comb/F-CDM, and T-CDM is fixed to (1,1). Since Comb/F-CDM have been used, the other ports 6 to 11 are defined using comb/F-CDM, and OCC in the other time domain is fixed to (1,−1).

As the ports are designed as above, DM-RS ports of a communication system of a carrier frequency of 6 GHz or more and a communication system of a carrier frequency less than 6 GHz have the same pattern. This will be described later in detail. It is difficult to perform orthogonalization through T-CDM at a carrier frequency of 6 GHz or more due to phase noise. Therefore, it is preferable that the same DM-RS is always repeatedly transmitted to two symbols. This is the same as T-CDM (1,1). Since all of the ports 0 to 5 use T-CDM (1,1) in accordance with the above suggestion, the ports 0 to 5 are defined as the same pattern regardless of a carrier frequency of 6 GHz or more or a carrier frequency less than 6 GHz. As a result, DM-RS ports for N layers (for example, N is 6 or less) are indicated using the same DM-RS table regardless of T-CDM or repetition pattern.

If T-CDM is not used finally, some of the ports 0 to 5 use T-CDM (1, 1), whereby DM-RS ports 0 to 5 to which the repetition pattern is applied and DM-RS ports 0 to 5 which use T-CDM (1,1), (1,−1) have their respective patterns different from each other. As a result, DM-RS ports for N layers (for example, N is 6 or less) should be indicated using a respective DM-RS table for a case that T-CDM is used and a case that the repetition pattern is used.

In a state that additional DM-RS together with front loaded DM-RS is configured for a fast UE and front loaded DM-RS is only configured for a slow UE, if the fast UE and the slow UE perform MU MIMO transmission, or if the number of additional DM-RS symbols of the UE which performs MU MIMO transmission is different, DM-RS power of a specific UE may be boosted at some symbols, whereas the DM-RS power may not be boosted at another some symbols. For example, if RPF is 2, the front loaded DM-RS at symbol 2 by comb 1 and additional DM-RS at symbol 9 by comb 1 may be configured for the fast UE, and the front loaded DM-RS at symbol 2 by comb 2 may be configured for the slow UE. At this time, DM-RS power of each UE at symbol 2 is twice boosted. However, since comb 2 DM-RS of the slow UE is not transmitted at symbol 9, additional DM-RS of the fast UE is not boosted. That is, instead of comb 2 DM-RS of the slow UE, data of the fast UE is transmitted to comb 2 RE. As a result, whether power is boosted in a unit of symbol for which DM-RS is configured should be determined. Moreover, a power boosting value should be set differently per symbol. Therefore, the fast UE calculates power boosting of port x and a boosting value differently per DM-RS symbol even though the port x is transmitted to several DM-RS symbols.

That is, the suggestion related to power boosting of the present invention, that is, the suggestion that the UE should decode data by assuming that each DM-RS port is boosted as much as N-K times if RPF is N and data or another RS is transmitted to K combs should be applied to each symbol for which DM-RS is configured.

If implementation of DM-RS power boosting in a symbol unit is complicated, the eNB may configure rate matching for each scheduled UE such that data may be transmitted from the DM-RS symbol to the same comb (that is, RE). To this end, the UE does not expect that the eNB performs rate matching such that data may be transmitted from each DM-RS symbol to a respective comb (that is, RE). Alternatively, the eNB may more simply restrict each scheduled UE such that different RS (for example, SRS, CSI-RS) may not be multiplexed at DM-RS symbol of the corresponding UE.

The eNB may indicate how many combs should not be mapped into data without indicating a comb into which data should not be mapped to perform data rate matching for DM-RS symbols. For example, since three combs exist in DM-RS configuration type 2 and at least one comb having DM-RS is configured, data rate matching is performed for the other one or two combs. In this case, the eNB notifies the UE of the number of combs into which data are not mapped. For example, when comb 0 to comb 2 exist, if DM-RS of the eNB exists in comb 0 and the number of combs for rate matching is set to 1, it is ambiguous whether comb 1 or comb 2 should perform rate matching. To solve this, data mapping is not performed for comb having small index among the other combs, and data mapping is performed for comb having great index.

For rate matching, DM-RS configuration type, the number and position of DM-RS symbols, the number of combs or comb index are combined through higher layer signaling signal multiple data RE mapping candidates, and actual data RE mapping is indicated by one of the above candidates through DCI.

If MU-MIMO data transmission is performed, the eNB may notify each UE of DM-RS port information of another UE subjected to MU-MIMO through DCI/RRC.

For example, since two CDM groups are defined in DM-RS configuration type 1, if UE 1 and UE 2 are subjected to MU MIMO by port 0 and port 1, respectively, the UE 1 may be notified that MU UE exists in port 1 and the UE 2 may be notified that MU UE exists in port 0. Additionally, the eNB may notify the UE of information as to whether data rate matching is performed for the other CDM groups to which desired DM-RS port (DM-RS port of a channel to data of the eNB are transmitted) and MU DM-RS port (DM-RS port of the other UE) are not indicated, through DCI or signaling such as RRC/MAC. The corresponding information may be notified through a TCI field (that is, field indicating QCL related information) within DCI or may be joint encoded and delivered to DM-RS table defined within DCI. Alternatively, the corresponding information may be defined by an independent field within DCI. For example, the UE 1 and the UE 2 perform MU MIMO transmission in CDM group 1 and notify the corresponding CDM group of the presence of data (that is, rate matching) with respect to the CDM group 2. Since three CDM groups exist in DM-RS configuration type 2, the eNB also notifies the UE of information as to whether data rate matching is performed for the other CDM groups to which desired DM-RS port and MU DM-RS port (DM-RS port of the other UE) are not indicated, through DCI.

The corresponding information may be expressed by a field of 1 bit-size in DM-RS configuration type 1. Since maximum two CDM groups to which desired DM-RS port and MU DM-RS port are not indicated may exist in case of DM-RS configuration type 2, the corresponding information is expressed by a 2-bit sized field. Alternatively, the corresponding information may be expressed by 1-bit sized field regardless of DM-RS configuration type. In case of DM-RS configuration type 2, the eNB notifies the UE of the presence of data for all other CDM groups to which desired DM-RS port and MU DM-RS port are not indicated.

Meanwhile, if a power ratio between DM-RS RE and data is different between UEs subjected to MU MIMO, a UE having MU IC capability performs blind detection for a power ratio between DM-RS RE and data of another MU UE or receives the power ratio from the eNB through signaling. However, since this operation increases signaling overhead or complicates UE implementation, the UE assumes that a power ratio between its DM-RS RE and data is always the same as a power ratio between DM-RS RE and data of another MU UE, and to make sure of this assumption, the eNB performs MU MIMO transmission by always setting a power ratio between DM-RS RE and data of UEs subjected to MU MIMO transmission to be the same as a power ratio between DM-RS RE and data of another MU UE.

Additionally, two CDM groups exist in DM-RS configuration type 1, and ports 0, 1, 4, 5 exist in CDM group 1. In this case, ports (0,1) are identified from each other by F-CDM, ports (4,5) are identified from each other by F-CDM, ports (0,4) are identified from each other by T-CDM, and ports (1,5) are identified from each other by T-CDM. Ports 2, 3, 6, 7 exist in CDM group 2. In this case, ports (2,3) are identified from each other by F-CDM, ports (6,7) are identified from each other by F-CDM, ports (2,6) are identified from each other by T-CDM, and ports (3,7) are identified from each other by T-CDM. However, the aforementioned port index is expressed by a value obtained by adding 1000 in the actual NR standard.

The eNB signals the following Table 10 when the number of maximum symbols of front loaded DM-RS is 2.

TABLE 10

| Index | DM-RS port index | # CDM group(s) without data | Front-load symbol |
|---|---|---|---|
| 0 | 0 | 1 | 1 |
| 1 | 0 | 2 | 1 |
| 2 | 1 | 1 | 1 |
| 3 | 1 | 2 | 1 |
| 4 | 2 | 2 | 1 |
| 5 | 3 | 2 | 1 |
| 6 | 0,1 | 1 | 1 |
| 7 | 0,1 | 2 | 1 |
| 8 | 2,3 | 2 | 1 |
| 9 | 0,2 | 2 | 1 |
| 10 | 0,1,2 | 2 | 1 |
| 11 | 0,1,2,3 | 2 | 1 |
| 12 | 0 | 2 | 2 |
| 13 | 1 | 2 | 2 |
| 14 | 2 | 2 | 2 |
| 15 | 3 | 2 | 2 |
| 16 | 4 | 2 | 2 |
| 17 | 5 | 2 | 2 |
| 18 | 6 | 2 | 2 |
| 19 | 7 | 2 | 2 |
| 20 | 0,1 | 2 | 2 |
| 21 | 2,3 | 2 | 2 |
| 22 | 4,5 | 2 | 2 |
| 23 | 6,7 | 2 | 2 |
| 24 | 0,4 | 2 | 2 |
| 25 | 2,6 | 2 | 2 |

TABLE 10-continued

| Index | DM-RS port index | # CDM group(s) without data | Front-load symbol |
|---|---|---|---|
| 26 | 0,1,2 | 2 | 2 |
| 27 | 3,4,6 | 2 | 2 |
| 28 | 0,1,2,3 | 2 | 2 |
| 29 | 4,5,6,7 | 2 | 2 |
| 30 | 0,4,2,6 | 2 | 2 |
| 31 | reserved | reserved | reserved |

Meanwhile, if only one CDM is used in rank 3 SU MIMO transmission, interference applied to a neighboring cell is varied per subcarrier, whereby a problem occurs in that the neighboring cell has a difficulty in managing interference. To solve this problem, it is preferable that {0,1,2}, {3,4,6} are used as ports for rank 3. As a result, if rank is 3 in SU MIMO transmission, interference is applied to the neighboring cell in both CDM group 1 and CDM group 2. The above suggestion solves the problem. Also, if rank 2 MU-MIMO transmission is performed for two UEs, the number of interference layers is equally 2 for each layer. For example, a layer of port 0 is interfered from port 1 and port 4. Since layers of different DCM groups have their respective subcarriers different from each other, the layers are operated with no interference. As the number of interference layers subjected to each layer is implemented equally, each layer has a similar average SINR. This similarity is finally favorable to achieve higher MCS in a target BLER (Block Error Rate).

Additionally, ports {0,1,2} and ports {3,4,5} may be added for rank 3. As a result, [port {0,1,2}, port {3,4,6}] and [port {0,1,2}, port {3,4,5}] may dynamically be switched and DM-RS configuration may be indicated. Alternatively, instead of ports {0,1,2}, ports {3,4,5}, ports {0,1,4} and ports {2,3,6} may be added for rank 3. In this case, [port {0,1,4}, port {2,3,6}] and [port {0,1,2}, port {3,4,5}] may dynamically switched and DM-RS configuration may be indicated.

Figure 9:
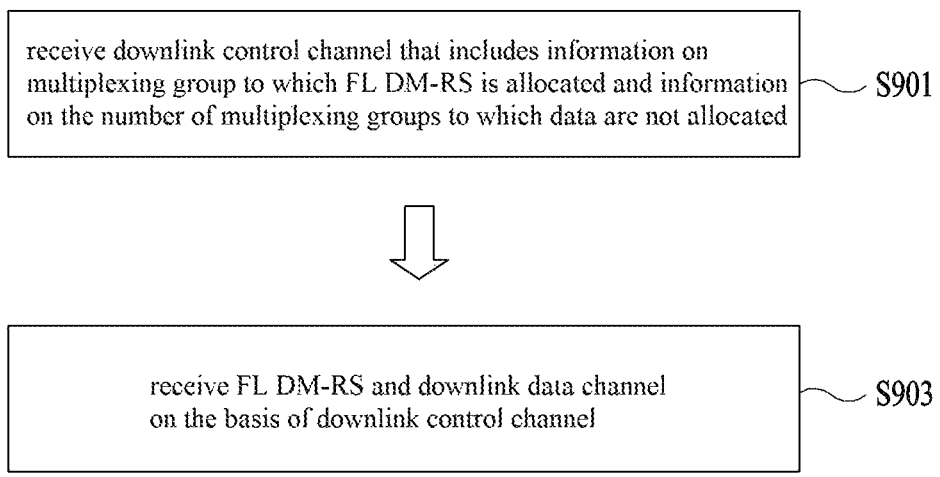
FIG. 9 is a flow chart illustrating a method for receiving a downlink signal in accordance with the embodiment of the present invention.

FIG. 9 is a flow chart illustrating a method for receiving a downlink signal in accordance with the embodiment of the present invention. Particularly, in FIG. 9, it is assumed that resource elements of a symbol to which a front loaded reference signal is received are identified by two multiplexing groups or three multiplexing groups.

Referring to FIG. 9, in step 901, the UE receives a downlink control channel from the eNB. Particularly, in FIG. 9, the downlink control channel includes information on a multiplexing group, to which a front loaded reference signal is allocated, among the multiplexing groups, and information on the number of multiplexing groups, to which data are not allocated, among the multiplexing groups. Also, the downlink control channel may further include information on the number of symbols for the front loaded reference signal.

Also, if the number of symbols for the front loaded reference signal is two or more, it is preferable that the information on a multiplexing group to which the front loaded reference signal is allocated and the information on the number of multiplexing groups to which data are not allocated are commonly applied to the two or more symbols.

Next, in step 903, the UE receives a downlink data channel and a front loaded reference signal for demodulation of the downlink data channel by using control information included in the downlink control channel. In more detail, the UE performs rate matching for data by using the information included in the downlink control channel. If the number of multiplexing groups is three and the number of multiplexing groups to which the data are not allocated is one, it is preferable that the multiplexing group to which the data are not allocated is a multiplexing group of a low index.

Additionally, the UE receives the downlink data channel under the assumption that the front loaded reference signal is power boosted as much as a specific multiple, wherein the specific multiple may be defined as a difference value between the number of the multiplexing groups and the number of the multiplexing groups to which the data are not allocated.

Figure 10:
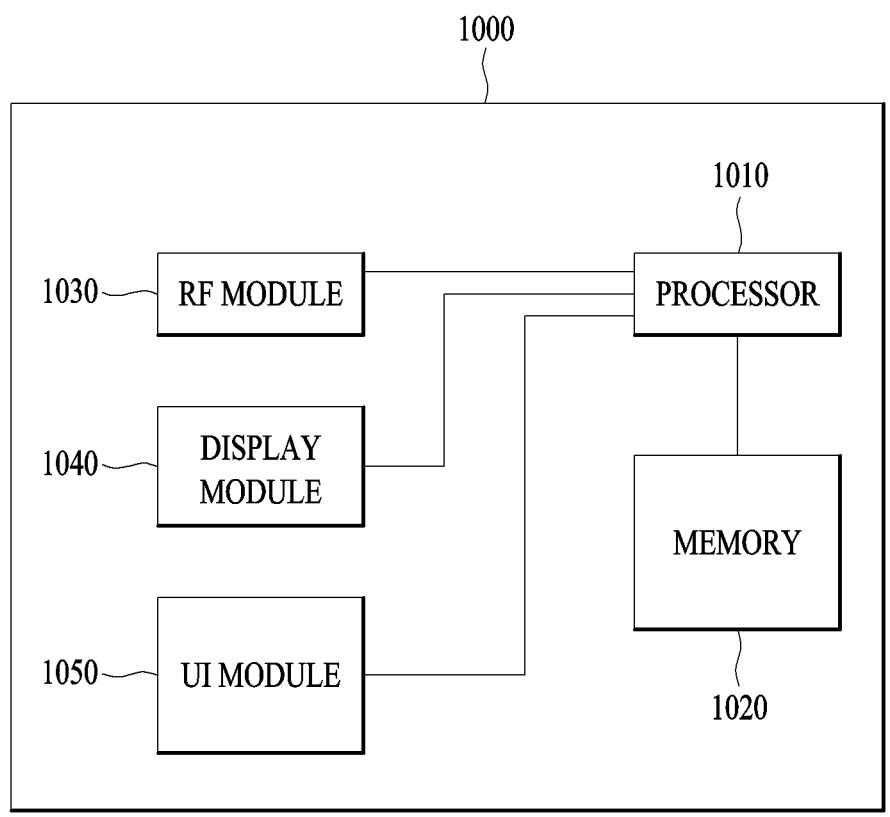
FIG. 10 is a block diagram of a communication apparatus according to an embodiment of the present invention.

FIG. 10 is a block diagram of a communication apparatus according to an embodiment of the present invention.

Referring to FIG. 10, a communication apparatus 1000 includes a processor 1010, a memory 1020, a Radio Frequency (RF) module 1030, a display module 1040 and a user interface module 1050.

The communication apparatus 1000 is shown for convenience of description and some modules thereof may be omitted. In addition, the communication apparatus 1000 may further include necessary modules. In addition, some modules of the communication apparatus 1000 may be subdivided. The processor 1010 is configured to perform an operation of the embodiment of the present invention described with respect to the drawings. For a detailed description of the operation of the processor 1010, reference may be made to the description associated with FIGS. 1 to 9.

The memory 1020 is connected to the processor 1010 so as to store an operating system, an application, program code, data and the like. The RF module 1030 is connected to the processor 1010 so as to perform a function for converting a baseband signal into a radio signal or converting a radio signal into a baseband signal. The RF module 1030 performs analog conversion, amplification, filtering and frequency up-conversion or inverse processes thereof. The display module 1040 is connected to the processor 1010 so as to display a variety of information. As the display module 1040, although not limited thereto, a well-known device such as a Liquid Crystal Display (LCD), a Light Emitting Diode (LED), or an Organic Light Emitting Diode (OLED) may be used. The user interface module 1050 is connected to the processor 1010 and may be configured by a combination of well-known user interfaces such as a keypad and a touch screen.

The above-described embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

The above-mentioned embodiments of the present invention are disclosed on the basis of a data communication relationship between a base station and a user equipment. Specific operations to be conducted by the base station in the present invention may also be conducted by an upper node of the base station as necessary. In other words, it will be obvious to those skilled in the art that various operations for enabling the base station to communicate with the user equipment in a network composed of several network nodes including the base station will be conducted by the base station or other network nodes than the base station. The term "Base Station" may be replaced with the terms fixed station, Node-B, eNode-B (eNB), or access point as necessary.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for receiving a downlink signal by a user equipment (UE) from an eNB in a wireless communication system, the method comprising the steps of:
   receiving a downlink control channel from the eNB; and
   receiving, from the eNB, a downlink data channel and a front loaded reference signal for demodulation of the downlink data channel by using control information included in the downlink control channel,
   wherein resource elements of symbols to which a front loaded reference signal is received are divided into two multiplexing groups or three multiplexing groups,
   wherein the downlink control channel includes information on a number of multiplexing groups, to which data are not allocated, among the multiplexing groups, and
   wherein, if the number of the multiplexing groups is three and the number of the multiplexing groups to which the data are not allocated is one, the multiplexing groups to which the data are not allocated is a multiplexing group having a lowest index.

2. The method according to claim 1, wherein the step of receiving the downlink data channel and the front loaded reference signal includes receiving the downlink data channel under the assumption that the front loaded reference signal is power boosted as much as a specific multiple, and the specific multiple is a difference value between the number of the multiplexing groups and the number of the multiplexing groups to which the data are not allocated.

3. The method according to claim 1, wherein the downlink control channel further includes information on a number of symbols for the front loaded reference signal.

4. The method according to claim 1, wherein, if a number of symbols for the front loaded reference signal is two or more, the information on the number of multiplexing groups to which data are not allocated are commonly applied to the two or more symbols.

5. A user equipment (UE) in a wireless communication system, the UE comprising:
 a wireless communication module; and
 a processor connected with the wireless communication module, receiving a downlink signal from an eNB,
 wherein the processor receives, from the eNB, a downlink data channel and a front loaded reference signal for demodulation of the downlink data channel by using control information included in a downlink control channel,
 wherein resource elements of symbols to which a front loaded reference signal is received are divided into two multiplexing groups or three multiplexing groups,
 wherein the downlink control channel includes information on a number of multiplexing groups, to which data are not allocated, among the multiplexing groups, and
 wherein, if the number of the multiplexing groups is three and the number of multiplexing groups to which the data are not allocated is one, the multiplexing group to which the data are not allocated is a multiplexing group having a lowest index.

6. The UE according to claim 5, wherein the processor receives the downlink data channel under the assumption that the front loaded reference signal is power boosted as much as a specific multiple, and the specific multiple is a difference value between the number of the multiplexing groups and the number of the multiplexing groups to which the data are not allocated.

7. The UE according to claim 5, wherein the downlink control channel further includes information on a number of symbols for the front loaded reference signal.

8. The UE according to claim 5, wherein, if a number of symbols for the front loaded reference signal is two or more, the information on the number of multiplexing groups to which data are not allocated are commonly applied to the two or more symbols.

* * * * *